United States Patent [19]

Kikumoto et al.

[11] 3,886,209
[45] May 27, 1975

[54] PROCESS FOR PREPARING ALPHA, OMEGA-DIAMINOCARBOXYLIC ACIDS

[75] Inventors: Ryoji Kikumoto; Masahiro Ito; Akio Nakamura; Tatsuo Nomura, all of Kanagawa, Japan

[73] Assignee: Mitsubishi Chemical Industries, Ltd., Tokyo, Japan

[22] Filed: Nov. 20, 1972

[21] Appl. No.: 307,900

[30] Foreign Application Priority Data
Nov. 19, 1971  Japan.............................. 46-92838

[52] U.S. Cl........ 260/534 R; 260/309.5; 260/534 L
[51] Int. Cl............................................. C07c 99/08
[58] Field of Search ........ 260/534 L, 534 R, 518 R, 260/309.5

[56] References Cited
UNITED STATES PATENTS
3,758,494  9/1973  Suverkropp et al............. 260/534 L

*Primary Examiner*—Vivian Garner
*Attorney, Agent, or Firm*—Sughrue, Rothwell, Mion, Zinn & Macpeak

[57] ABSTRACT

A process for producing an $\alpha,\omega$-diaminocarboxylic acid which comprises contacting a 2-cyano saturated cyclic amine under reaction conditions with $H_2O$, $NH_3$ and $CO_2$, to obtain a reaction product containing 5-($\omega$-aminoalkyl)hydantoin, and hydrolyzing the reaction product is disclosed.

13 Claims, No Drawings

PROCESS FOR PREPARING ALPHA, OMEGA-DIAMINOCARBOXYLIC ACIDS

BACKGROUND OF THE INVENTION

1. Field of the Invention

This invention relates to a novel synthesis process for $\alpha\omega$-diaminocarboxylic acids.

2. Description of the Prior Art

It has heretofore been known that $\alpha,\omega$-diaminocarboxylic acids can be produced by hydrolyzing the corresponding 5-($\omega$-aminoalkyl)hydantoins in the presence of an acid or alkali. However, these hydantoins are generally synthesized by extremely complicated procedures which involve various reaction steps. For example, 5-(4-aminobutyl)hydantoin, an intermediate for lysine which is a typical $\alpha,\omega$-diaminocarboxylic acid, is generally prepared by a complicated process, for example, by treating hydroxyvaleraldehyde with hydrogen cyanide, ammonium bicarbonate or the like to give 5-(4-hydroxybutyl)hydantoin and substituting for the hydroxyl group of the thus obtained product a chlorine atom and then an amino group.

SUMMARY OF THE INVENTION

The present inventors, after research relating to processes for preparing $\alpha,\omega$-diaminocarboxylic acids have discovered a novel synthesis route for such materials. In greater detail, they found that a 5-($\omega$-aminoalkyl)hydantoin can be obtained in one step by reacting a 2-cyano saturated cyclic amine as a starting material with ammonia, carbon dioxide and water. Further, they discovered that the product obtained by the above reaction not only contains the desired hydantoin but also a precursor capable of being converted easily into an $\alpha,\omega$-diaminocarboxylic acid by hydrolysis with an acid or alkali and, therefore, that the $\alpha,\omega$-diaminocarboxylic acid could easily be obtained in high yields by hydrolyzing the above reaction product.

The object of this invention is, therefore, to provide a novel process which will be highly advantageous in industrial use for producing an $\alpha,\omega$-diaminocarboxylic acid such as lysine, ornithine and the like, or alkyl derivatives thereof.

The object of this invention is easily accomplished by contacting a 2-cyano saturated cyclic amine with a reactant selected from the group consistng of: (i) $H_2O$, $NH_3$ and $CO_2$; (ii) a compound which is capable of providing $NH_3$ and $CO_2$ together with an aqueous medium; and (iii) a mixture of said compound and at least one of $H_2O$, $NH_3$ and $CO_2$ to obtain a reaction product containing 5-($\omega$-aminoalkyl)hydantoin, and hydrolyzing the reaction product to obtain an $\alpha,\omega$-diaminocarboxylic acid.

DETAILED DESCRIPTION OF THE INVENTION

The 2-cyano saturated cyclic amine used as a starting material in the present invention can be any stably existing saturated cyclic compound having 2 to 11 carbon atoms and a nitrogen atom as ring forming members. The most typical and preferred of such compounds used as starting materials in the present invention are 2-cyanopiperidine, 2-cyanopyrrolidine or lower alkyl derivatives thereof represented by the formula:

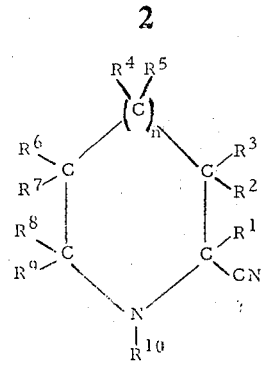

wherein $R^1$, $R^2$, $R^3$, $R^4$, $R^5$, $R^6$, $R^7$, $R^8$ and $R^9$ each represents hydrogen, a lower alkyl group or an aryl group, for example a phenyl group, a lower alkyl substituted phenyl group, etc., $R^{10}$ represents hydrogen or a lower alkyl group, and n is 0 or 1. A preferred lower alkyl group in the above definition has 1 to 6 carbon atoms. Although the above formula is defined as excluding derivatives other than lower alkyl or aryl derivatives, the present invention is not limited to compounds of the above formula, and may be applied to those derivatives where the ring-forming carbon atoms carry functional groups which do not take part in the reaction of this invention.

For the purpose of descriptive convenience and brevity, the process of the present invention will be further illustrated by the specific example in which 2-cyanopiperidine ($n$ is 1 in the above formula) is used as a starting material and lysine is prepared via 5-(4-aminobutyl)hydantoin as an intermediate, but this invention is not to be limited to the specific embodiments described below.

The reaction according to the present invention can be illustrated by the following reaction scheme:

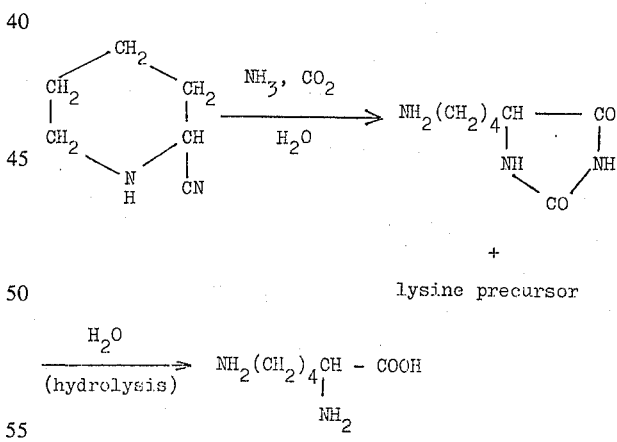

The chemical structure of the lysine precursor recited above has not yet been identified, and at present the precursor cannot be isolated from the mixture of 5-(4-aminobutyl)hydantoin and the precursor obtained in the first step of the reaction. Therefore, this precursor is defined as being obtainable together with 5-(4-aminobutyl)hydantoin by the reaction of 2-cyanopiperidine with ammonia, carbon dioxide and water and hydrolyzable together with 5-(4-aminobutyl)hydantoin to produce the desired lysine. The presence of this precursor has been recognized by the fact that the yield of 5-(4-aminobutyl)hydantoin alone from 2-cyanopiperidine is less than the overall yield of lysine from the 2-cyanopiperidine.

According to the reaction formula heretofore set out only one mole of $NH_3$ and one mole of $CO_2$ seem to react with one mole of 2-cyanopiperidine. However, in the course of the reaction was observed in practice the existence of $H_2O$ is necessary and an excess of $NH_3$ is desirable. Though the reaction itself can proceed with any amount of each reactant, so long as all necessary reactants are present, from the industrial point of view it is advantageous to consume the 2-cyanopiperidine in a one pass reaction due to the higher cost of this compound as compared to the other reactants.

The upper limit of the amount of each reactant is not overly critical in the present invention, however, too large an excess of $NH_3$, $CO_2$ and $H_2O$ leads to an unnecessarily high operation cost.

Considering all of the above factors, the amounts of $NH_3$, $CO_2$ and $H_2O$ used are usually selected so as to be in the ranges of 2 – 100 moles, 1 – 50 moles and 1 – 1000 moles, respectively, per mole of 2-cyanopiperidine, and seldom will less than 1 mole each of $NH_3$, $CO_2$ and $H_2O$ per 1 mole of 2-cyanopiperidine be used considering the high cost of the latter compound and the desire to react the same as fully as possible.

These reactants, i.e., ammonia, carbon dioxide and water, may be supplied either separately or as a combination of two of these reactants, for example, ammonia and carbonated water or as a combination of three of these reactants, for example, an aqueous solution into which ammonia and carbon dioxide have been bubbled. Alternatively, a compound which is capable of providing ammonia, carbon dioxide and water may be used. Examples of such a compound include ammonium carbonate and ammonium bicarbonate. Further, another type of compound which is capable of providing only two of said three reactants may be used together with another reactant. An example of such a case is ammonium carbamate together with water. Further, if necessary, water, ammonia or carbon dioxide or a mixture of two or more reactants may be used in conjunction with either of the above two types of compounds. The optional combinations of these reactants aas described above are hereinafter referred to as hydantoin forming reagents.

The present invention can be carried out more advantageously (i.e., with increased yields) in the presence of a small amount of a cyanide substance, such as hydrogen cyanide and/or a cyanide salt, during the reaction of the hydantoin forming reagent and 2-cyanopiperidine to increase the total yield of 5-(4-aminobutyl)hydantoin and the lysine precursor as defined above. Preferred cyanide salts are ammonium, alkali metal or alkaline earth metal cyanides which are easily soluble in water, such as sodium, potassium and calcium salts, etc. Other cyano compounds which provide cyano ion in an aqueous medium can also be employed as the cyanide substances, so long as they are soluble in water and do not release any moieties which might hinder the progress of the reaction or be difficult to remove.

The use of a too large amount of the cyanide substance results in various complicated by-products upon contacting with the above-described hydantoin forming reagent, in particular, the ammonia component. Further, a too small amount of cyanide substance will not produce the desired effect of increasing the yield of 5-(4-aminobutyl)hydantoin. Considering these two factors, the most suitable amounts of cyanide substance range from 0.01 to 1 mole, preferably from 0.02 to 0.5 mole, equivalents (as a cyano molar equivalent) per 1 mole of 2-cyanopiperidine subjected to the reaction. The theoretical mechanism for the increase in the total yield of 5-(4-aminobutyl)hydantoin and the lysine precursor by the use of the cyanide substance has not yet been confirmed, but it is believed that a certain equilibrium exists in the conversion from 2-cyanopiperidine to a mixture of 5-(4-aminobutyl)hydantoin and the lysine precursor and that the cyanide substance may enter into the equilibrium balance, shifting the equilibrium to the product side.

Various methods can be used for contacting the above-described hydantoin forming reagent and the optional cyanide substance with 2-cyanopiperidine. For example, these substances may be contacted with each other to form a tertiary system per se or the cyanide substance and 2-cyanopiperidine can first be contacted and then the hydantoin forming reagent supplied to the mixture of the cyanide substance and 2-cyanopiperidine.

The reaction may proceed in the absence of a solvent but an appropriate aqueous medium can be advantageously used because there is no need to supply additional water which serves as a reactant. Further, an organic solvent which is inert to the reaction system, for example, alcohols, benzene, cyclohexane or the like may be used. Of these organic solvents, a solvent having a mutual solubility with the water existing in the reaction system is desirable. Although a heterogenous reaction system can be used, better results are generally obtained with a homogenous system.

The reaction between 2-cyanopiperidine and the hydantoin forming reagent can be carried out at a temperature higher than 40°C, generally from 60°C to 250°C, preferably from 80°C to 200°C. Usually the reaction is completed in approximately 5 minutes to 8 hours. The most suitable reaction time varies depending upon the reaction temperature used, for example, if a higher temperature would be adopted, a shorter time would be appropriate.

Reaction is conducted at a pressure sufficient to maintain the water in the liquid phase at the temperature of reaction. Generally a pressure greater than atmospheric is used, and the maximum pressure of operation is not overly critical since pressure is merely set so as to maintain a liquid system.

After completion of the reaction, unreacted excess material, particularly ammonia and carbon dioxide, are distilled off under reduced pressure to obtain a residue containing the desired 5-(4-aminobutyl)hydantoin of the present invention.

The residue thus obtained contains the above described lysine precursor in addition to the 5-(4-aminobutyl)hydantoin, and can be subjected to hydrolysis using any standard procedure without isolating each of the components to obtain the desired lysine.

The reaction for hydantoin formation is described heretofore only as to the production of lysine from 2- cyanopiperidine, but the reaction conditions and the reaction procedures set forth above can also be applied to the production of any type of α,ω-diaminocarboxylic acid in the same manner by merely substituting for lysine, 2-cyanopiperidine and 5-(4-aminobutyl)hydantoin, the α,ω-diaminocarboxylic acid, corresponding 2-cyano saturated cyclic amine and corresponding 5-(ω-aminoalkyl)hydantoin, respectively.

The hydrolysis of the reaction product containing 5-(ω-aminoalkyl)hydantoin and amino acid precursor can be carried out under the same conditions as for the hydrolysis of hydantoin alone in the presence of an acid or an alkali. The acid or alkali which can be used for the hydrolysis can be any well-known acid or alkali which can be used to hydrolyze 5-(4-aminoalkyl)hydantoin, but the preferred acid or alkali includes a mineral acid such as hydrochloric acid or sulfuric acid or an alkali metal hydroxide such as sodium hydroxide or potassium hydroxide, etc. The conditions for the hydrolysis are not critical, but the hydrolysis is generally carried out at a temperature of from 120°C to 250°C for a period of from 10 minutes to 5 hours using water in an amount of from 5 to 80% by weight of the reaction system and an alkali or acid in an amount of from 0.5 to 10 equivalents, preferably more than 1 equivalent, based on a mole of 2-cyano saturated cyclic amine which is fed as a starting material. The pressure during hydrolysis is greater than atmospheric so as to maintain the system in the liquid phase.

The reaction mixture obtained from the above hydrolysis is then treated in a usual manner, for example, by neutralizing the reaction mixture, distilling off any light boiling substances such as ammonia, carbon dioxide and/or water, followed by treatments such as evaporation to dryness, distillation, extraction with an organic solvent and the like, either individually or using combination of these treatments.

The hydantoin forming reaction and the hydrolysis reaction described above can be effected in either a batch or continuous manner. Further, these two reaction steps can be conducted as a single reaction by suitably selecting the time at which the materials required for each reaction are supplied. However, in some cases, it is advantageous to remove any excess of starting materials which remain in the system by distillation or other suitable procedures after completion of the hydantoin forming reaction and then to conduct the hydrolysis reaction.

As is described above in detail, the desired α,ω-diaminocarboxylic acid can be produced in good yields by an extremely simple procedure in accordance with the process of this invention.

The process of the present invention will now be further illustrated by way of examples, but such examples are not to be construed as limiting the present invention. Various changes and modifications can be made therein without departing from the spirit and the scope of the present invention.

Unless otherwise indicated, in the following examples all percentages and parts are by weight.

EXAMPLE 1

22 g (0.2 mole) of 2-cyanopiperidine, 145 g (1.5 moles) of ammonium carbonate and 200 cc of water were charged into a 500 cc autoclave, heated to 100°C and maintained at that temperature for 2 hours at a pressure of about 6 Kg/cm$^2$. Excess ammonium carbonate and water were then distilled off from the reaction mixture to give a residue. Analysis of the residue by heat-detecting liquid chromatography indicated that the residue contained 0.095 mole of 5-(4-aminobutyl)hydantoin.

To this residue was added 400 g of 25 percent sulfuric acid and the mixture was heated in 180°C for a period of 1 hour at a pressure of about 10 Kg/cm$^2$. After cooling, the mixture was neutralized with Ca(OH)$_2$ to form a precipitate, which was then filtered off and, after driving off ammonia, 30 cc of hydrochloric acid was added to the filtrate followed by evaporation to dryness. The dried residue was then dissolved in 95 percent ethanol and 20 g of pyridine was added to the ethanol solution to obtain 30.3 g of a white solid having a melting point of 254°C. This solid substance was identified as DL-lysine hydrochloride by elementary analysis and the infrared spectrum thereof. The yield based on the moles of 2-cyano piperidine was 83 percent.

The results indicated that the above-described residue after the hydantoin forming reaction was mainly 5-(4-aminobutyl) hydantoin, but also contained lysine precursor.

EXAMPLE 2

22 g (0.2 mole) of 2-cyanopiperidine, 145 g (1.5 moles) of ammonium carbonate and 200 cc of water were charged into a 500 cc autoclave, heated to 150°C and maintained at that temperature for 30 minutes at a pressure of about 15 Kg/cm$^2$. Unreacted ammonium carbonate and water were distilled off from the reaction mixture and 400 g of 25 percent sulfuric acid was added to the residue followed by heating at 180°C for 1 hour at a pressure of about 10 Kg/cm$^2$. After cooling, the mixture was neutralized with Ca(OH)$_2$ and the precipitate which formed was filtered. After driving off ammonia from the filtrate, 300 cc of 35 percent hydrochloric acid was added to the filtrate and the mixture was evaporated to dryness. The residue thus obtained was dissolved in 95 percent ethanol and to the resulting solution was added 20 g of pyridine to obtain 29 g of a white solid having a melting point of 248° to 252°C. Recrystallization from 90 percent ethanol gave a substance having a melting point of 253° to 254°C. This substance was identified as DL-lysine hydrochloride by elementary analysis and the infrared spectrum thereof. The yield based on the moles of 2-cyanopiperidine was found to be 79 percent.

The same procedure as described in the above Example was repeated but substituting 20 percent sodium hydroxide for sulfuric acid to hydrolyze the above-described residue. The product was neutralized with hydrochloric acid followed by working up in the same manner as in the above example to obtain a lysine salt. The yield was comparable to that obtained using sulfuric acid.

EXAMPLE 3

19.2 g (0.2 mole) of 2-cyanopyrrolidine, 145 g (1.5 moles) of ammonium carbonate and 200 cc of water were charged into a 500 cc autoclave, heated to 100°C and maintained at that temperature for 2 hours at a pressure of about 6 Kg/cm$^2$. Distillation of the ammonium carbonate and water from the reaction mixture gave a residue. Quantitative analysis of the residue using heat-detecting liquid chromatography indicated that the residue thus obtained contained 0.093 mole of 5-(3-aminopropyl)hydantoin.

To the above residue was then added 400 g of 25 percent sulfuric acid and the mixture was heated at 180°C for 1 hour at a pressure of about 10 Kg/cm$^2$. After cooling, the mixture was neutralized with Ca(OH)$_2$ and the precipitate which formed was filtered. After driving off ammonia from the filtrate, 30 cc of hydrochloric acid was added thereto and the mixture was then evaporated to dryness. The dried residue was dissolved in 95 percent ethanol and 20 g of pyridine was added thereto to obtain 21.9 g of a white solid having a melting point of 232° to 233°C. This solid was identified as DL-ornithine hydrochloride by elementary analysis and by the infrared spectrum thereof. The yield based on moles of 2-cyanopyrrolidine was 65 percent.

The results indicated that the above residue was mainly composed of 5-(4-aminobutyl)hydantoin but also contained other ornithine precursors.

EXAMPLE 4

22 g (0.2 mole) of 2-cyano-2-methylpyrrolidine, 145 g (1.5 moles) of ammonium carbonate and 200 cc of water were charged into a 500 cc autoclave, heated to 150°C and maintained at that temperature for 30 minutes at a pressure of about 15 Kg/cm$^2$. The ammonium carbonate and water were distilled off from the reaction mixture to give a residue, and 63.1 g of barium hydroxide (Ba(OH)$_2$.8H$_2$O) and 200 cc of water were added to the residue followed by heating at 180°C for 1 hour in an autoclave at a pressure of about 4 Kg/cm$^2$. Carbon dioxide gas was then bubbled through the reaction mixture and the precipitated barium carbonate was then separated by filtration. The filtrate was distilled off under reduced pressure to leave 2-methylornithine carbonate as a residue. The resulting product was dissolved in 20 cc of water and 300 cc of ethanol was added to the solution to form a white precipitate which was then filtered to yield 27.4 g of 2-methylornithine carbonate.

The carbonate thus obtained was then converted into the monopicrate form using standard procedures known to the art and recrystallized from ethanol to give the desired 2-methylornithine monopicrate as a yellow crystal having a melting point of 238° to 240°C, with decomposition. The elementary analysis of the product was as follows:

2-Methylornithine Monopicrate
Calcd. for C$_{13}$H$_{17}$N$_5$O$_9$: C, 38.40; H, 4.57; N, 18.66
Found: C, 38.10; H, 4.89; N, 18.40

EXAMPLE 5

22 g of 2-cyanopiperidine, 145 g of ammonium carbonate, 0.54 of hydrogen cyanide and 200 cc of water were charged into a 500 cc autoclave and maintained at 130°C for a period of 30 minutes while stirring at a pressure of about 9 Kg/cm$^2$. Distillation of the ammonium carbonate and water from the reaction mixture gave a residue. Quantitative analysis of the residue using heat-detecting liquid chromatography indicated that the residue contained 0.134 mole of 5-(4-aminobutyl)hydantoin.

40.0 g of 25 percent sulfuric acid was then added to the residue and the mixture was heated at a temperature of 180°C for 1 hour at a pressure of about 10 Kg/cm$^2$. After cooling, the mixture was rendered neutral with Ca(OH)$_2$ and the precipitate which formed was filtered. After driving off ammonia from the filtrate, 30 cc of 33 percent hydrochloric acid was added to the filtrate followed by evaporation to dryness. The resulting residue was then dissolved in 95% ethanol and 20 g of pyridine was added to the solution to precipitate a colorless solid. This solid was filtered and washed with ethanol to obtain 32.7 g of a product having a melting point of 252° to 254°C. As a result of elementary analysis and an analysis of the infrared spectrum, the product was identified as DL-lysine monohydrochloride. The overall yield from 2-cyanopiperidine reached 89.5 percent based on the moles of 2-cyanopiperidine.

It was confirmed from the above results that the above 5-(4-aminobutyl)hydantoin-containing residue also contains lysine precursors in addition to 5-(4-aminobutyl)hydantoin, in view of the fact that the yield of lysine monohydrochloride was 89.5 percent whereas that of 5-(4-aminobutyl)hydantoin, which is an intermediate for lysine monohydrochloride, was 67.0 percent.

When the reaction was carried out in the same manner as described above but without using hydrogen cyanide in the hydantoin forming reaction, the yield of lysine was found to be 79.0 percent.

EXAMPLE 6

The same procedure as described in Example 5 was repeated except that the molar ratio of the reactants in the hydantoin forming reaction was changed to 2-cyanopiperidine: (NH$_4$)$_2$CO$_3$:H$_2$O:HCN=1:10:40:0.1 and the reaction time was changed to 15 minutes. In this case, 5-(4-aminobutyl)hydantoin was obtained in 75 percent yield. Further, the resulting reaction mixture comprising 5-(4-aminobutyl)hydantoin and other lysine precursors was then hydrolyzed in the same manner as described in Example 5 to obtain lysine monohydrochloride in 89 percent yield. When the reaction was carried out without using hydrogen cyanide, 5-(4-aminobutyl) hydantoin and lysine monhydrochloride were obtained in 43 percent. and 79 percent yields, respectively.

EXAMPLE 7

The same procedure as described in Example 5 was repeated except that liquid ammonia was supplied in addition to the reactants used in Example 5, the molar ratio of the reactants was changed to 2-cyanopiperidine: (NH$_4$)$_2$CO$_3$: NH$_3$: H$_2$O: HCN = 1:10:10:40:0.2 and the reaction temperature was changed to 120°C. In this case, 5-(4-aminobutyl)hydantoin was obtained in 76 percent yield. Further, the resulting reaction mixture comprising 5-(4-aminobutyl)hydantoin and other lysine precursors was hydrolyzed in the same manner as described in Example 5 to obtain lysine monohydrochloride in 90 percent yield. When the reaction was carried out without using hydrogen cyanide, 5-(4-aminobutyl)hydantoin and lysine monohydrochloride were obtained in 41 percent and 76 percent yields, respectively.

EXAMPLE 8

The same procedure as described in Example 7 was repeated except that the molar ratio of the hydrogen cyanide in the hydantoin forming reaction was changed from 0.2 to 0.05, the reaction temperature was changed to 150°C and the reaction time was changed to 15 minutes. In this case, 5-(4-aminobutyl)hydantoin and lysine monohydrochloride were obtained in 70 percent and 85 percent yields, respectively.

What is claimed is:

1. A process for producing an α,ω-diaminocarboxylic acid which comprises contacting a 2-cyano 5- or 6-membered saturated cyclic amine as defined by the following formula (new formula)

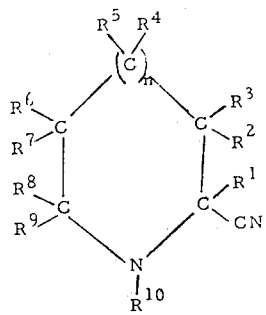

wherein $R^1$, $R^2$, $R^3$, $R^4$, $R^5$, $R^6$, $R^7$, $R^8$ and $R^9$ each represents hydrogen, a lower alkyl group having 1 to 6 carbon atoms, or a phenyl or lower alkyl substituted phenyl group, $R^{10}$ represents hydrogen or a lower alkyl group and $n$ is 0 or 1, at a temperature from 40° to 250°C., with 1–1,000 moles of $H_2O$, 1–100 moles of $NH_3$ and 1–50 moles of $CO_2$, per mole of 2-cyano 5- or 6-membered saturated cyclic amine, to obtain a reaction product containing 5- (ω-aminoalkyl) hydantoin, and hydrolyzing said reaction product.

2. A process according to claim 1 wherein the 2-cyano 5- or 6-membered saturated cyclic amine is 2-cyanopiperidine.

3. A process according to claim 1 wherein the 2-cyano 5- or 6-membered saturated cyclic amine is 2-cyanopyrrolidine.

4. A process according to claim 1 wherein the 2-cyano 5- or 6-membered saturated cyclic amine is 2-cyano-2-methylpyrrolidine.

5. A process according to claim 1 wherein in the initial reaction mixture $NH_3$ and $CO_2$ are provided by ammonium carbonate, ammonium bicarbonate or ammonium carbamate in an aqueous medium.

6. A process according to claim 1 wherein the contact of the 2-cyano 5- or 6-membered cyclic amine with the reactant is carried out in the presence of hydrogen cyanide or an ammonium, alkali metal or alkaline earth metal cyanide salt.

7. A process according to claim 6 where the cyanide substance is present in an amount of from 0.01 to 1 mole of cyanide substance (expressed as cyano equivalents) per mole of 2-cyano saturated cyclic amine.

8. A process according to claim 1 wherein the reaction is completed within about 5 minutes to 8 hours.

9. A process according to claim 1 wherein any remaining $NH_3$ and $CO_2$ in the reaction product are eliminated before the hydrolysis.

10. A process according to claim 1 wherein the hydrolysis is conducted in the presence of an acid or alkali.

11. A process according to claim 10 wherein the acid or alkali is present in an amount of from 0.5 to 10 molar equivalents, per mole of 2-cyano 5- or 6-membered saturated cyclic amine starting material.

12. A process according to claim 1 wherein a portion of the $NH_3$ and $CO_2$ is provided by ammonium carbonate, ammonium bicarbonate or ammonium carbamate and at least a portion of one of $NH_3$ and $CO_2$ is provided as such.

13. A process for producing an α,ω-diaminocarboxylic acid which comprises contacting a 2-cyano 5- or 6-membered saturated cyclic amine of the formula:

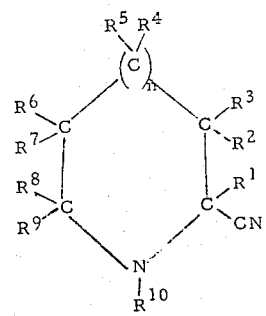

alkyl substituted phenyl group, $R^{10}$ represents hydrogen or a lower alkyl group, and $n$ is 0 or 1, with from 2 to 100 moles of $NH_3$, 1 to 50 moles of $CO_2$ and 1 to 1000 moles of $H_2O$, per mole of 2-cyano saturated cyclic amine at a temperature of from 40°C to 250°C at a pressure sufficient to maintain the reaction system liquid to obtain a reaction product containing substantial proportions of 5-(ω-aminoalkyl)hydantoin, hydrolyzing said reaction product to obtain the desired α,ω-diamino carboxylic acid, hydrolysis being in the presence of from 1 to 10 equivalents of an acid or alkali per mole of 2-cyano 5- or 6-membered saturated cyclic amine starting material, at a temperature of from 120°C to 250°C and with the addition of water in an amount of from 5 to 80 percent by weight of the reaction system and separating the α,ω-diaminocarboxylic acid.

* * * * *